United States Patent [19]
Hughes

[11] 3,870,926
[45] Mar. 11, 1975

[54] CAPACITOR VOLTAGE TRANSFORMER SYSTEM

[75] Inventor: Michael Alan Hughes, Gnosall, England

[73] Assignee: The English Electric Company Limited, London, England

[22] Filed: Aug. 16, 1973

[21] Appl. No.: 388,804

Related U.S. Application Data
[63] Continuation-in-part of Ser. No. 207,039, Dec. 13, 1971, abandoned.

[30] Foreign Application Priority Data
Dec. 18, 1970 Great Britain............... 60147/70

[52] U.S. Cl................. 317/12 B, 317/31, 324/126
[51] Int. Cl. ........................................... H02h 7/16
[58] Field of Search..... 317/12 R, 12 B, 14 R, 14 B, 317/31, 61, 49, 50, 53; 307/149; 323/61; 324/126

[56] References Cited
UNITED STATES PATENTS
2,510,631  6/1950  Harder................. 317/49
3,401,304  9/1968  Woodworth.................. 317/12 B
3,458,764  7/1969  Gertsch et al.................. 317/14 R Primary Examiner—James D. Trammell
Attorney, Agent, or Firm—Kirschstein, Kirschstein, Ottinger & Frank

[57] ABSTRACT

A system for monitoring very high voltage e.g., 100 kv and above is provided in which a capacitor chain is connected across the voltage. An electromagnetic transformer feeding slow responding circuits is connected across the capacitor at the lower potential end of the chain. An additional impedance, preferably a capacitor, is connected in the chain and a buffer amplifier feeding fast responding circuits is connected across this additional impedance.

6 Claims, 2 Drawing Figures

CAPACITOR VOLTAGE TRANSFORMER SYSTEM

This application is a continuation-in-part of U.S. Ser. No. 207,039 filed Dec. 13, 1971 now abandoned.

This invention relates to a system for monitoring very high alternating voltages, e.g., 100 kv and above.

A voltage monitoring system, for any high alternating voltage, usually consists of secondary circuits i.e., metering and protective circuits, and a voltage transformer for insulating such secondary circuits from the voltage to be monitored (hereinafter called the line voltage) and for providing a voltage to the secondary circuits which is proportioned to the line voltage. The transformer is usually an electromagnetic transformer, but as the cost of an electromagnetic transformer rises steeply as the voltage to be monitored increases, for very high voltages, the electromagnetic transformer is often replaced by a capacitor voltage transformer.

A capacitor voltage transformer consists, and in this specification is defined as so consisting of a capacitor chain for connection across the line voltage and an electromagnetic transformer connected across the capacitor at the low potential end of the chain, the output from the electromagnetic transformer feeding the secondary circuits. Usually, an extra inductance is provided which tunes the electromagnetic transformer to the rated frequency with the capacitance of the chain. Under steady state conditions the output voltage from the electromagnetic transformer will be in phase with and proportional to the line voltage.

It is known however, that when a rapid change occurs in the line voltage, the output from the electromagnetic transformer does not accurately reproduce the new value of the line voltage, that is the output does not follow the change closely. This is due to the fact that transient oscillations are generated in the capacitors and the electromagnetic transformer and the output voltage does not reproduce the new value of the line voltage until these transient oscillations have died away. Whilst this does not affect the performance of the metering circuits and certain slow acting protective circuits, it can seriously affect the performance of high speed protective circuits which are expected to operate well before the transient oscillations caused by a change in line voltage have died away.

In U.S. Pat. No. 2,510,631, this problem is solved by providing, on the secondary side of the electromagnetic transformer, a branch circuit for the high speed circuits and by introducing in this branch circuit a compensator-voltage which neutralizes the voltage drop occasioned by the metering and other slow acting circuits. This voltage is provided by connecting an auxiliary capacitance and an auxiliary inductance in series with the output from the electromagnetic transformer and shunting off the branch circuit from the output of the electromagnetic transformer. The branch circuit serially including the secondary winding of a compensating electromagnetic transformer, the primary winding of which is connected across both the auxiliary capacitance and the auxiliary inductance.

U.S. Pat. No. 3,458,764 also relates to CVT's but is directed to protecting the CVT from the damaging effects of ferro-resonance. When the electromagnetic transformer saturates, as can happen when the CVT is energized, ferro-resonance produces transient oscillations. These oscillations are different from the transient oscillations which form the problem that U.S. Pat. No. 2,510,631 and the present invention seek to solve, and are detected by comparing a voltage on a part of the capacitor chain with a voltage which is proportional to the voltage of the capacitive transformer output. The difference between these two voltages changes when the ferro-resonance oscillations are present and an additional damping burden is switched into the CVT when a change is detected. However, this arrangement would not detect the presence of the oscillations due to the sudden change in line voltage and therefore the CVT of U.S. Pat. No. 3,458,764 would not provide a rapid response to changes in the line voltage.

It is an object of the present invention to provide a high voltage monitoring system which, in a simple manner, can provide a rapid response to rapid changes in the line voltage.

In this specification, circuits which need an input which follows changes in the line voltage closely and whose performance therefore is adversely affected by the generation of transient oscillations, for example high speed protective relays which must operate within 0.02 seconds of a change occurring in the line voltage, are termed "fast response" circuits and circuits which do not need to follow changes in the line voltage closely and whose performance therefore is not adversely affected by the generation of transient oscillations are termed "slow response" circuits.

According to the invention, a high voltage monitoring system comprises a capacitive voltage transformer consisting of a capacitor chain for connection across the voltage to be monitored and an electromagnetic transformer connected across the capacitor at the low potential end of the chain to produce a first output which follows closely the voltage to be monitored under steady state conditions thereof, slow response circuits connected to said first output, an additional impedance connected in the capacitor chain to produce a second output which follows closely the voltage to be monitored under steady state and changing conditions thereof and fast response circuits connected to said second output.

According to a preferred aspect of the invention, the additional impedance is a capacitor and a buffer amplifier is included between the capacitor and the fast response circuits.

There are several reasons for retaining the electromagnetic transformer instead of relying solely on the additional impedance output. One is that some of the circuits to be fed present a high burden, up to 200 VA, which is greater than can conveniently be accommodated by present amplifiers. Another is that the output signal does not rely solely on the reliability of the new additional impedance and amplifier in place of the proved reliability of the electromagnetic transformer. A third is that it would be very costly to carry out conversion on existing installations if the electromagnetic transformer were not retained.

Two embodiments of the invention will now be described, by way of example, with reference to the accompanying drawings, in which.

Figure 1:
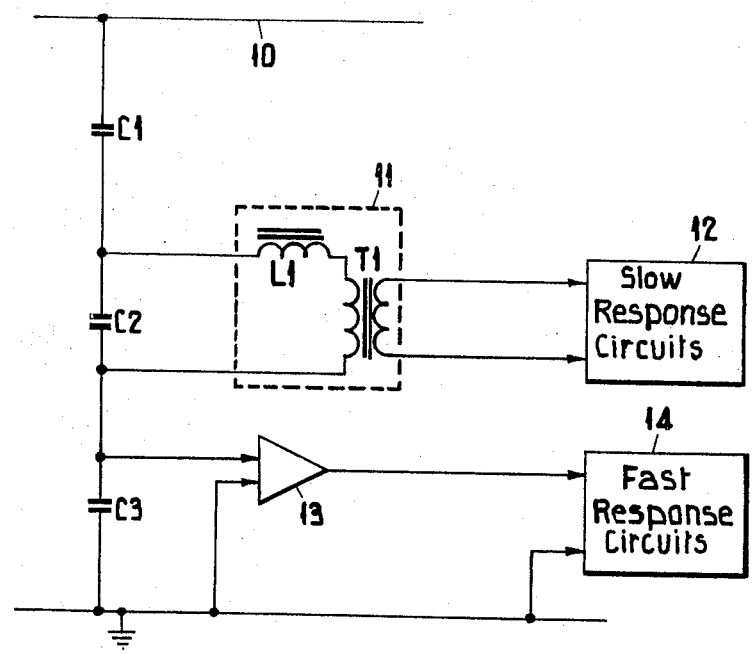
FIG. 1 is a circuit diagram, partly in block form, of one embodiment.

Referring to FIG. 1, the voltage on line 10 is to be measured. A capacitor chain comprising capacitors C1 and C2 is connected between line 10 and earth; C1 may represent a series of capacitors. An electromagnetic unit 11 is connected across capacitor C2; this unit includes a transformer T1, a further tuning inductor L1 which provides any inductance required in addition to that of the transformer T1, and other circuitry such as spark gaps and means for the suppression of ferro resonance (not shown). The unit 11 feeds various secondary circuits 12.

In addition to these known components, a further capacitor C3 is included in the capacitor chain, and the voltage across C3 is fed to a buffer amplifier 13 which in turn feeds secondary circuits 14. The amplifier 13 may be omitted if the circuits 12 are of capacitive burden. The capacitors C1 C2, have values such that nearly all the line voltage is dropped across C1. For example, for a 400 kv system, C1 is $2 \times 10^3$ pf and C2 is $34 \times 10^3$ pf. Thus, although the transient oscillations produce equal disturbances across C1 and C2, as only 5% of the voltage is dropped across C2, the ratio of disturbance to the voltage across the capacitor is much higher for C2 and C1.

The value of the capacitor C3 is chosen such that it appears as a very small error in the value of C1, e.g., 0.05% for the 400 kv system previously mentioned, whilst it produces an output voltage which is a scalar proportion of the voltage across the capacitor C1. Thus under changing conditions of the line voltage, i.e., when transient oscillations are generated, the voltage across C3 will follow the change in the line voltage much more closely than the voltage across C2. Accordingly the circuits which have to respond rapidly to changing line voltages are included in unit 14, while those which need only respond relatively slowly are included in unit 12. The fast response circuits may, for example, form part of a high speed protective relay system, such as a distance relay.

Figure 2:
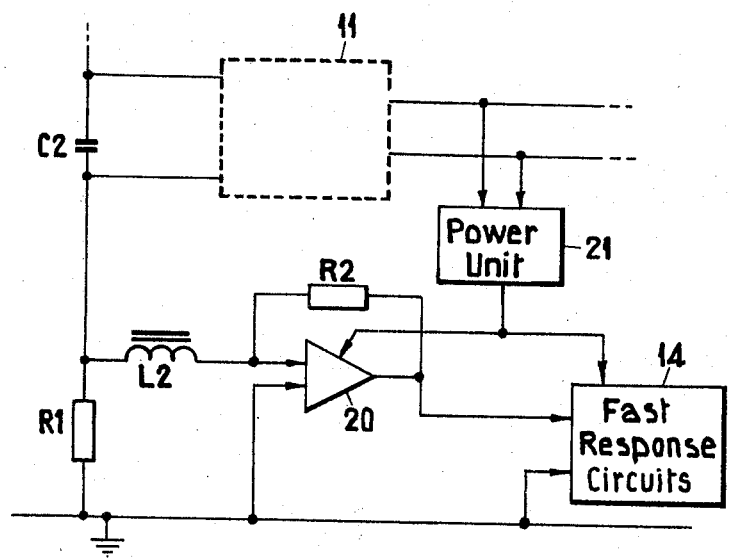
FIG. 2 is a partial circuit diagram of the other embodiment.

FIG. 2 shows a variation of the circuit of FIG. 1. Instead of the additional capacitor C3 of FIG. 1, the additional impedance is made up of a resistor R1 included in the capacitor chain, and having value small enough not to load the chain appreciably and an integrater consisting of an operational amplifier 20 having a feed back resistor R2 and an inductor L2, whose inductance is high enough not to load resistor R1 appreciably.

In this circuit, the voltage across resistor R1 is equal to the current through the capacitor chain, and therefore to the differential of the voltage across C1. This voltage across R1 is applied to the inductor L2, the other end of which is a virtual earth because of the feedback resistor. The current through the inductor is therefore the integral of the voltage applied to it. The same current flows through the feedback resistor R2, the voltage across which is proportional to the current through it. The output voltage from amplifier 20 is therefore directly proportional to the voltage across C1, and thus follows the line voltage reasonably closely under transient oscillation conditions. The output voltage is in fact of reversed sign, but this is easily corrected if necessary.

FIG. 2 also shows a power unit for the amplifier 20 and fast response circuits 14, fed from the unit 11. This power unit may include back-up batteries. The amplifier, if any, and the fast response circuits may thus obtain their power supply from the capacitor voltage transformer system instead of from an external supply. A similar arrangement may be provided for the circuit of FIG. 1.

I claim:

1. A high voltage monitoring system comprising a capacitor voltage transformer consisting of capacitor chain for connection across the voltage to be monitored and an electromagnetic transformer connected across a capacitor at the low potential end of the chain, the output produced by said transformer constituting a first output which follows closely the voltage to be monitored under steady state conditions thereof, a slow response circuit connected to said first output to respond to changes in the voltage to be monitored, an additional impedance connected in the capacitor chain, the output produced by the additional impedance constituting a second output which follows closely the voltage to be monitored under both steady state and rapidly changing conditions thereof and a fast response circuit connected across said second output to respond to rapid changes in the voltage to be monitored.

2. A system according to claim 1, in which the additional impedance is a capacitor.

3. A system according to claim 2, including a buffer amplifier between the capacitor and the fast response circuits.

4. A system according to claim 1, in which the additional impedance comprises a resistor connected in the capacitor chain, and an integrater for integrating the voltage across the resistor.

5. A system according to claim 3, in which power for the fast response circuits and the buffer amplifier or the operational amplifier is supplied from the electromagnetic transformer.

6. A system according to claim 1, in which the fast response circuits include a high speed protective relay system.

* * * * *